Figure 1:
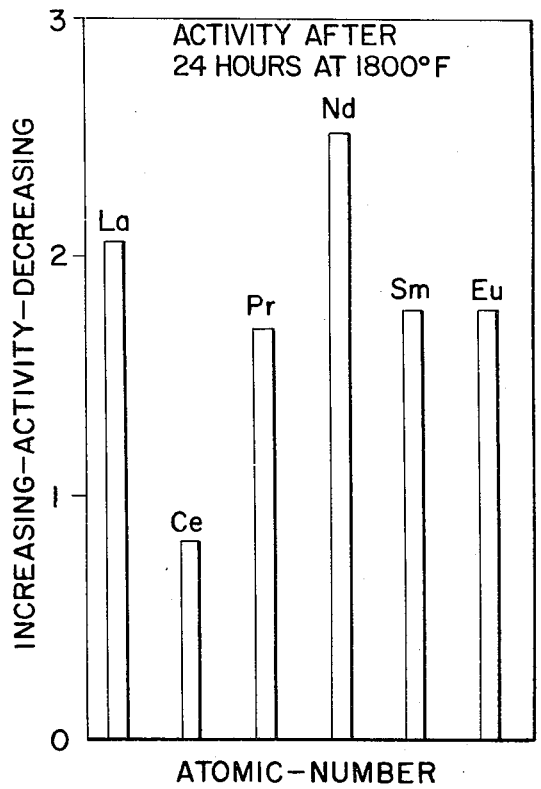

United States Patent [19]

Sergeys et al.

[11] 3,903,020

[45] Sept. 2, 1975

[54] STABILIZED AUTOMOTIVE EXHAUST GAS CATALYST

[75] Inventors: Frank John Sergeys, Kensington; James Michael Maselli, Ellicott City; Michael Vance Ernest, Baltimore, all of Md.

[73] Assignee: W. R. Grace & Co., New York, N.Y.

[22] Filed: Feb. 15, 1974

[21] Appl. No.: 442,982

Related U.S. Application Data

[63] Continuation-in-part of Ser. No. 271,856, July 14, 1972, abandoned.

[52] U.S. Cl............. 252/455 R; 252/460; 252/462; 252/466 PT; 423/213.5
[51] Int. Cl.².................... B01J 23/10; B01J 23/62
[58] Field of Search............ 252/462, 466 R, 455 R, 252/460; 423/213.2, 213.5

[56] References Cited
UNITED STATES PATENTS

| | | | |
|---|---|---|---|
| 3,259,453 | 7/1966 | Stiles................................ | 423/213.5 |
| 3,322,491 | 5/1967 | Barrett et al..................... | 252/462 X |
| 3,741,725 | 6/1973 | Graham............................ | 423/213.5 |

*Primary Examiner*—W. J. Shine
*Attorney, Agent, or Firm*—Joseph P. Nigon, Esq.

[57] ABSTRACT

A process for preparing an ultra stable catalyst capable of converting the noxious components in exhaust gases to innocuous entities is described. The catalyst is made by applying a solution of a salt of a noble metal such as palladium or platinum to a specially prepared support followed by activation at 1,800°–2,100°F. The special support is prepared by activating and stabilizing common support materials such as alumina with cerium oxide at high temperatures prior to application of the noble metal. The catalyst is stable to 2,100°F.

7 Claims, 4 Drawing Figures

STABILIZED AUTOMOTIVE EXHAUST GAS CATALYST

This case is a continuation-in-part of U.S. Ser. No. 271,856, filed July 14, 1972, and now abandoned.

BACKGROUND OF THE INVENTION

The problem of air pollution is not a new one. However, the problem has become more and more serious in many cities in recent years. Most of the pollution is a result of compounds which are derived from unburned or partially burned hydrocarbons found in the exhaust of internal combustion engines.

Several investigators have realized the only practical way to treat exhaust fumes to control hydrocarbon and carbon monoxide pollution is to oxidize the hydrocarbons to carbon dioxide and water and to oxidize the carbon monoxide to carbon dioxide. Thus, there is the problem of finding materials capable of not only catalyzing these reactions but also having sufficient chemical and physical stability to withstand the extreme temperature environment which will exist in any catalytic exhaust device.

A wide selection of oxidation catalysts has been produced in the past varying both in chemical compositions and physical structure. With respect to chemical composition, the ability of a wide variety of metals and metal oxides either alone or in combination having the activity necessary to catalyze the complete oxidation of hydrocarbons and carbon monoxide has been noted.

To be sufficiently effective for the removal of hydrocarbons and carbon monoxide from exhaust gases and to meet the standards of maximum emissions currently set by the Environmental Protection Agency, a catalyst for treating exhaust gases must become operational within a very few seconds after engine start-up and must maintain high activity throughout the various modes of engine operation.

The problem of excessively high temperatures which are obtained when high concentrations of pollutants are being oxidized must also be solved in this system. It is not unusual for excursions in catalyst temperature to reach 1,800°F. or higher. Present catalytic systems cannot withstand prolonged exposure to these temperatures without thermal or thermochemical degradation of the catalyst leading to loss in activity, shrinkage and severe attrition which renders the catalytic device useless.

A particularly suitable support for exhaust catalysts is gamma alumina. At low temperatures the alumina is present as the gamma or other transition forms. However, as the temperature increases these transitional aluminas undergo a phase change to alpha alumina. This is undesirable because it results in a severe loss in surface area and physical strength. These changes in turn lessen the effectiveness of the catalyst because of shrinkage which causes lower activity, gas by-passing and loss of catalyst due to attrition.

The use of noble metals to catalyze the conversion of exhaust gases to innocuous entities is well-known. In addition to being the principal components of these catalysts, several of the noble metals are also used in small amounts to promote activity of base metal catalyst systems. U.S. Pat. No. 3,189,563 of Hauel, issued June 15, 1965, is typical of the patents relating to the use of noble metal catalysts for the conversion of automobile exhaust gases. U.S. Pat. No. 3,455,843 to Briggs, et al., issued July 15, 1969, is typical of a base metal catalyst system promoted with a noble metal. Unpromoted base metal catalysts have been described in U.S. Pat. No. 3,322,491 by Barrett, et al., issued May 30, 1967.

BRIEF DESCRIPTION OF THE INVENTION

We have found that a catalyst having unexpectedly high thermal stability, good activity and excellent physical durability can be prepared by applying noble metals such as palladium, and platinum or combinations thereof to specific supports. These active supports are unique in their ability to induce maximum dispersibility of the noble metals which results in optimum activity. In addition, the specific supports have also been found to maintain the highly despersed nature of the noble metals in extreme thermal environments. The active supports consist of cerium oxide distended on any of the common catalyst carriers having sufficient strength, surface area and porosity. Examples of suitable catalyst carriers include such materials as mullite, spinel, silica, or alumina.

A unique and unexpected feature of the system is the retention of catalytic and physical properties even after exposure to temperatures of 1,800° to 2,100°F for 24 hours. The catalytic system may be in the form of granules or distended or coated onto a honeycomb monolithic support.

The first step in the preparation of the novel catalyst system is the selection of a suitable catalyst carrier. Although several potential candidates exist as noted earlier, the preferred carrier can be any of the many different forms of alumina. For purposes of simplicity, we will describe our catalyst system using alumina as the support, although it is obvious that one of the previously noted carriers may be substituted for alumina.

The alumina surface area should be between 20–300 $m^2/g$ and have sufficient porosity to accept between 0.3 to 1.0 ml. of solution per gram of solid. The alumina carrier is subsequently converted to a unique active and stabilized support by distending cerium oxide on its surface. Very broadly the procedure comprises applying an aqueous solution of cerium nitrate, chloride, acetate, or any suitable soluble salt to an alumina carrier. The impregnated alumina is then dried at about 300°F and further subjected to high temperature, 1,800° to 2,000°F for 2 to 24 hours, to complete the preparation of the active and stabilized base. For optimum performance and stabilization against thermal damage the resulting support should contain 2 to 50% preferably 2 to 10% by weight of the distended cerium oxide and have between 20 and 80 $m^2/g$ surface area. When cerium oxide is applied to the alumina it is converted to the $CeO_2$ form of the oxide by the high temperature treatment (as confirmed by X-ray diffraction analysis). The X-ray data further show that no substantial chemical interaction occurs between the cerium oxide and the alumina carrier. Only two crystalline phases are clearly present below 2,000°F, $CeO_2$ and transition alumina. Trace quantities of alpha alumina begin appearing above 2,000°F. The cerium dioxide crystallites that are distended on the alumina are very small as measured by X-ray line broadening and consequently exhibit a very high specific surface area.

After the above procedure, the support can be either granulated to be used in the form of pills, balls, extrudates, etc., or can be reduced to a micron sized powder for coating honeycomb monolithic forms of auto exhaust catalysts.

The monolith, exclusive of a catalyst coating consists essentially of spodumene, cordierite, mullite, spinel or alumina.

In the second step of the process the activated and stabilized support is then clad or impregnated with solutions of the salts of a desired noble metal, palladium or platinum, for example. Any of the soluble salts of these noble metals can be used in this step of our process. Examples of suitable salts include the nitrates, nitrites, the chlorides, the tetrammine nitrates. The preferred noble metal is palladium. The noble metal can be present to the extent of 0.01 to 1.0% by weight based on the support in the granular form of the catalyst and from 0.05 to 5.0% based on the support in the monolithic version. The support being applied or coated onto the monolith to the extent of 5–20% by weight based on the weight of the monolith. The preferred catalyst contains 0.01 to 0.5 weight percent palladium and 2 to 10 weight percent cerium oxide distended on nodules of alumina.

In the last step of our process, the catalyst is activated by heating to temperatures of 1,800° to 2,000°F for periods of 2–24 hours. A particularly satisfactory catalyst is obtained by calcination of the palladium impregnated support at a temperature of 1,800° to 1,900°F for periods of about 4 to 6 hours.

Figure 4:
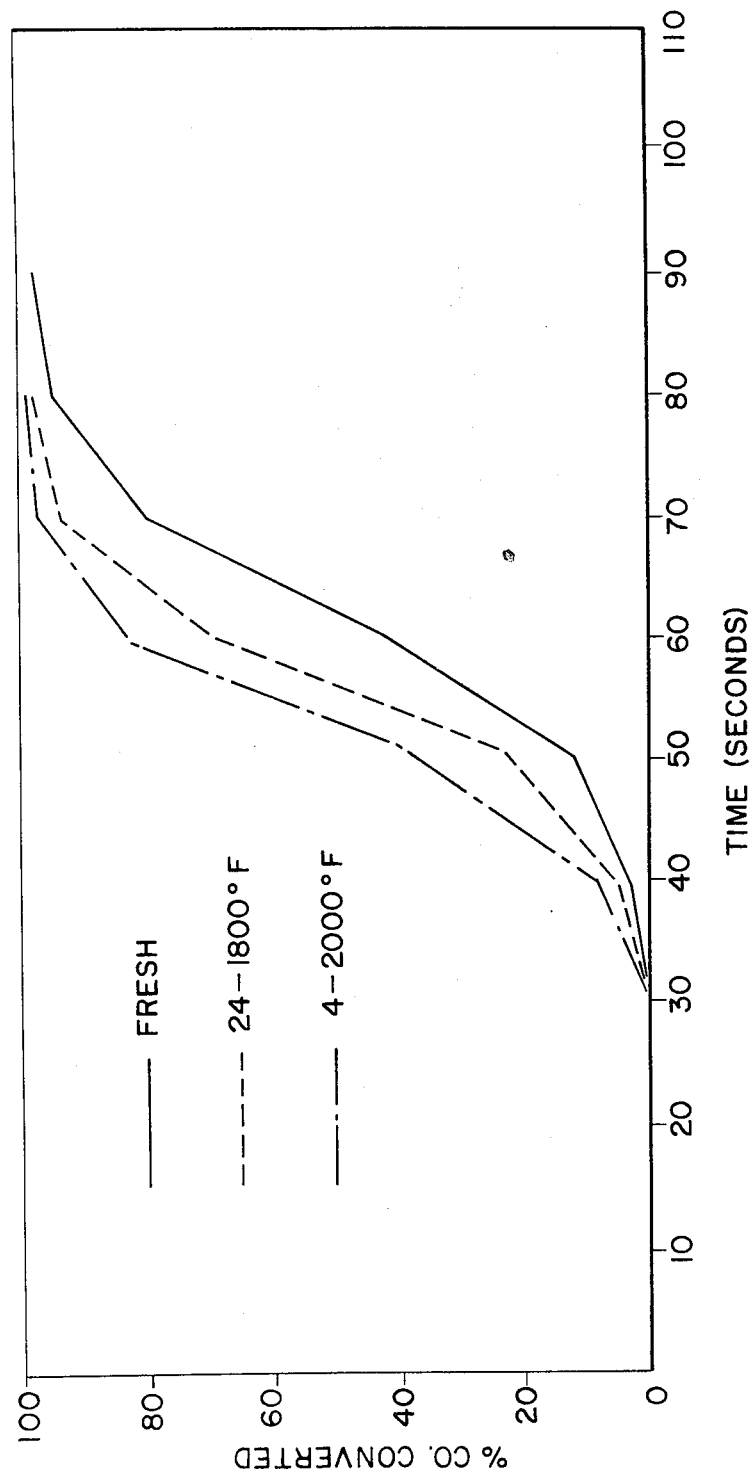

As mentioned previously, one of the outstanding properties of this system is the fact that the catalytic activity and palladium surface area are not effected by and in some cases improve after exposure to temperatures approaching 2,000°F. This is demonstrated particularly well in Examples III, IX and XI. It is apparent from the data in these Examples that the catalysts that had been exposed to temperatures of 1,800° to 2,000°F for extended periods of time exhibited improved activity over the freshly prepared catalyst and retention of palladium surface area. These results are shown graphically in the FIG. 4.

The catalytic performance of the system was evaluated using two methods. One of the methods simulated an exhaust gas environment in a bench sized apparatus. The other utilized the procedure for chassis testing described in detail in the Federal Register of July, 1970, as modified by the instructions in the Federal Register of July, 1971. They are both publications and are incorporated herein by reference.

Broadly speaking, the chassis evaluation is designed to determine the hydrocarbon, carbon monoxide and oxides of nitrogen in gas emissions from an automobile while simulating the average trip in an urban area of 7½ miles from a cold start. The test consists of engine start up and vehicle operation on a chassis dynamometer through a specified driving schedule consisting of a total of 1,371 seconds. A proportionate part of the diluted gas emissions is collected continuously for a subsequent analysis using a constant volume sampler.

The dynamometer run consists of two tests, a cold start test after a minimum of 12 hours soak, and a hot start test with a 10-minute soak between the two tests. Engine start up and operation over a driving schedule and engine shut down constitutes the complete cold start test. Engine start up and operation over the first 505 seconds of the driving schedule completes the hot start test.

The engine emissions are diluted with air to a constant volume and a portion sampled in each test. Composite samples are collected in bags and analyzed for hydrocarbons, carbon monoxide, carbon dioxide, and oxides of nitrogen. Parallel samples of diluted air are similarly analyzed for hydrocarbons, carbon monoxides, and oxides of nitrogen. The gas samples are analyzed for hydrocarbons by a flame ionization detector and for carbon monoxide and carbon dioxide by nondispersive infrared analysis. Nitrogen oxides are determined by nondispersive infrared and ultraviolet analysis. The gasoline used in this test is 100 octane gasoline containing less than 0.5 grams of organic lead per gallon.

The bench test is designed to simulate the exhaust gas composition and heat up conditions experienced by a catalyst during the initial part of the actual chassis dynamometer run. The test approximates the environment the catalyst will experience during the all-important "cold start" segment of the chassis test which accounts for a substantial portion of the total carbon monoxide emitted.

Monoliths for bench evaluation are of a size 1 inch in diameter by 1 inch long. Granular catalysts are approximately $3 \times 4$ mm in size and fill 13 cc of reactor volume. Total gas rate is regulated to achieve a gas hourly space velocity of approximately 38,000. The simulated exhaust gas contains 1,700 ppm carbon as hexane, 4.5 volume percent oxygen, 10.0 volume percent water vapor, 6.5 volume percent carbon monoxide with the balance made up by nitrogen. The gas mixture is preheated so that the inlet gas temperature to the bed of catalyst is 600°F. As the hot gas passes through the room temperature catalyst, the bed begins to heat up in a manner similar to heat up in an actual catalytic device on an automobile. When the temperature in the bed becomes high enough, catalytic oxidation of the carbon monoxide and hydrocarbon in the stream commences and the temperature increases at an accelerated rate due to the heat of reaction. Catalyst perfomance is measured by determining the time required for given conversions of carbon monoxide and hydrocarbon. The more active catalysts will convert similar quantities of fuel in shorter periods of time.

Physical properties on the granular catalysts are determined by measuring attrition, crush strength and shrinkage. The attrition test measures the percent weight loss experienced by 10 grams of catalyst exposed for one-half hour to a continuous air blast of 7.1 cubic feet per minute. The catalyst is contained in an inverted 1-liter flask fitted with an orifice covered by a 14 mesh screen to allow the escape of attrited catalyst particles. The material remaining in the flank after the test is weighed to determine the weight loss.

The crush strength of the granules or extrudates is the load in pounds required to just fracture a particle of catalyst.

Shrinkage is determined by measuring the percent decrease in bulk volume of the granules after exposure to a specified temperature for a given length of time.

A rapid method for determining the surface area of palladium was developed using a hydrogen adsorption-desorption technique. The method described below makes partial use of the hydrogen chemisorption technique reported in the literature by C. E. Hunt, (J. of Catalysis 23, 93 (1971) and the phenomenon reported by L. J. Gillespie and F. P. Hall (J. Chem. Soc. 48 1207

(1926) that hydrogen shows very little solubility in palladium at room temperature (21°C) if the pressure of the hydrogen is kept below about 15 mm. Hg.

The apparatus used for the chemisorption measurements was a PerkinElmer - Shell Sorptometer. A single carrier gas of 2 volume % $H_2$ in $N_2$ (or Ar) was used for initially reducing the sample, for adsorption of $H_2$ at 21°C and as the purge gas for carrying the desorbed hydrogen to a chromatographic type TC detector. The experimental procedure consisted of (1) reducing 0.05 to 0.5g of catalyst sample held in a U-tube with the carrier gas (2% $H_2$ in $N_2$) at 430°C, using a molten lead bath for 15 minutes (2) removing the sample from the lead bath and allowing it to cool to room temperature (3) allowing the $H_2$ from the carrier gas stream to adsorb on the supported palladium catalyst for 5 minutes (4) rapidly heating the catalyst to 420°C, using the molten lead bath, to desorb chemically bonded hydrogen and (5) measuring the amount of hydrogen desorbed from the peak area recorded by the chromatographic-type detector.

From the hydrogen peak area the amount of hydrogen chemisorbed in terms of micromoles $H_2$/gram of noble metal is found using the following equation:

$$\text{moles } H_2/g. \text{ noble metal} = U = \frac{Pa}{Ta}\left[\frac{273}{760}\right]\left[\frac{10^{-6}}{22414}\right]\frac{ccH_2}{\text{Sample wt.} \times \text{fraction noble metal}}$$

where:
Pa and Ta are pressure and temperature at detector
$ccH_2$ = GC factor × attenuation × intergrator counts.
Assuming one atom of hydrogen chemisorbs on one exposed metal atom and that the area of a single Pd atom is 8.0 A the specific surface area, S.A., expressed in $m^2$/gram of noble metal can be calculated as follows:

S.A. ($m^2$/g. Pd (Pt)) = U × 8.0 $A^2$ × $10^{-20}$ $m^2/A^2$ × 6.023 × $10^{23}$ × $10^{-6}$ = U × 4.818 × $10^{-2}$

EXAMPLE I

This example illustrates the general technique for the preparation of a granular form of the catalyst.

A total of 4.5 kilograms of alumina extrudates approximately 3 × 4mm in size having a surface area of 250 $m^2$/g and a water absorption of 1.0 ml per gram were impregnated to incipient wetness with 4,500 ml of an aqueous solution of cerous nitrate containing the equivalent of 65 mg of $Ce_2O_3$ per ml of solution. The saturated extrudates were dried at 300°F for 6 hours then calcined at 1,850°–1,900°F for 4 hours. The resulting activated and stabilized support had a surface area of 58 $m^2$/g.

After the calcination, 4,792 ml of an aqueous solution of palladium tetrammine dinitrate containing 400 micrograms of palladium per ml of solution were applied to the extrudates which were maintained at a temperature between 150° and 250°F during the application. The catalyst was then activated by calcination for 3 hours at 1,800°F. After activation the catalyst had a surface area of 57 $m^2$/g and contained the equivalent of 6.0% $Ce_2O_3$, 0.04% Pd and the balance was alumina.

EXAMPLE II

The catalyst in Example I was evaluated using the method described previously.

Five liters of this catalyst were charged to a catalytic muffler fitted to the exhaust system of a 350 cubic inch, 1970 V-8 Chevrolet sedan. The performance was measured utilizing the Federal EPA driving test on a chassis dynamometer. The exhaust gas was analyzed and the emissions were found to be 0.25 grams per mile hydrocarbon and 3.83 grams per mile carbon monoxide. This compares with an average of 1.6 grams per mile hydrocarbon and 34.0 grams per mile carbon monoxide emitted in the absence of the catalyst. Thus the catalyst effectively removed 84.4% of the hydrocarbons and 88.6% of the carbon monoxide from the exhaust gas.

EXAMPLE III

The thermal stability of the catalyst is illustrated in this example.

The catalyst used was prepared using the same procedure and had the same composition as the one described in Example I. This catalyst was evaluated on the 1970 Chevrolet sedan using the Federal test procedure described previously. Hydrocarbon and carbon monoxide emissions were found to be 0.25 grams per mile (84.4% reduction) and 4.48 grams per mile (86.8% reduction), respectively. The catalyst was discharged from the catalytic muffler and exposed to a temperature of 1,950°F for 12 hours. After the severe thermal treatment the catalyst was tested once again. No loss in catalytic activity was observed. Efficiency for removal of hydrocarbon and carbon monoxide from the exhaust gas remained high at 87.5% (0.20 g/mile) and 90.4% (3.27 g/mile), respectively.

EXAMPLE IV

This example illustrates the general technique for the preparation of the monolithic form of the catalyst.

Monolithic supports are commercially available. These monoliths can be prepared from cordierite, mullite, spinel, alumina, etc., cordierite is preferred.

An aqueous solution of cerous nitrate was applied to alumina powder or granules having surface area and water pore volume similar to the alumina described in Example I. After drying at about 300°F for 4 hours, the material was ground to a fine sized powder, preferably less than 10 microns, by either fluid energy milling or ball milling. The powder was then activated by calcination for 4 hours at 1,850°F. The resulting material consisted of alumina and from 6 to 50% cerium oxide expressed as $Ce_2O_3$ (See Table I and III) and had a surface area of 20–80 $m^2$/g. This finely ground powder was mixed with enough water to form a suspension that contained about 26% solids. Palladium nitrate was added to bring the palladium to the desired level, 0.08 to 4.30% (See Table I). Commercially available monoliths measuring approximately 4 inches in diameter by 3 inches long were coated by immersing the monolith in the catalyst suspension. After removal, the excess coating was removed by an air blast. The monoliths were dried at about 250°F. for 4 hours and calcined for at least 4 hours at 1,800°–1,850°F. Table I gives composition of monolithic catalysts prepared by this general technique.

TABLE I

| CATALYST | % Cerium Oxide As $Ce_2O_3$ in the Coating | % Coating on the Monolith | % Pd in the Coating |
| --- | --- | --- | --- |
| A | 6.0 | 7.8 | 1.50 |
| B | 10.0 | 6.5 | 4.30 |
| C | 20.0 | 8.5 | 2.70 |
| D | 25.0 | 6.2 | 2.40 |
| E | 6.0 | 9.0 | 0.15 |
| F | 6.0 | 9.7 | 0.08 |

EXAMPLE V

Each of the monolithic catalysts described in Example IV and Table I were evaluated on a 1971 vehicle having a 350 cubic inch V-8 engine using the Federal test procedure described previously. The emission results are given in Table II.

TABLE II

| CATA-LYST | HYDROCARBONS g/mile | CARBON MONOXIDE g/mile |
| --- | --- | --- |
| A | 0.43 | 4.83 |
| B | 0.45 | 4.09 |
| C | 0.39 | 4.14 |
| D | 0.35 | 4.11 |
| E | 0.62 | 9.72 |
| F | 0.67 | 12.16 |
| None | 0.75 | 20.0 |

EXAMPLE VI

This example demonstrates the influence cerium oxide has on the catalytic activity of the system.

A series of catalysts were prepared employing the same general procedure described in Example I. All the catalysts contained 0.04% Pd (with the exception of Catalyst K) the cerium oxide content being varied from zero to 50% by weight. The catalyst carrier provided the balance of the composition and in all cases was alumina granules, approximately 3 × 4 mm. The data given in Table III show that cerium oxide improves the activity and thermal stability of the catalytic system as measured on the bench apparatus by the procedure described in the text.

TABLE III

| CATALYST | % Cerium Oxide as $Ce_2O_3$ | Time (Seconds) for 90% CO Conversion |
| --- | --- | --- |
| G | NONE | 178 |
| H | 2 | 130 |
| I | 4 | 92 |
| J | 6 | 67 |
| K (0.1% Pd) | 6 | 67 |
| L | 10 | 64 |
| M | 25 | 64 |
| N | 50 | 76 (1.5% Pd on the support) |
| J (calcined 14 hours at 2000°F) | | 57 |

EXAMPLE VII

This example illustrates the performance of the catalyst system that contains platinum.

A catalyst was prepared in a manner similar to that described in Example I except that platinum tetrammine dinitrate was added to the palladium tetrammine dinitrate solution to the extent that the final composition of the catalyst was 0.04% palladium, 0.02% platinum, 6.0% cerium oxide expressed as $Ce_2O_3$ and the balance being alumina carrier. After being heated for 24 hours at 1,800°F this sample exhibited excellent catalytic activity when tested by the procedure utilized for evaluation of the catalysts listed in Table III. This platinum containing sample required only 67 seconds to convert 90% of the carbon monoxide.

EXAMPLE VIII

This example shows the excellent retention of physical properties after severe thermal treatment.

The properties and experiments listed in Table IV were measured using a catalyst prepared exactly as described in Example I.

TABLE IV

| HEAT TREATMENT | SHRINKAGE IN VOLUME PERCENT | CRUSH STRENGTH (IN POUNDS) | ATTRITION (IN PERCENT) |
| --- | --- | --- | --- |
| None | — | 7 | 4 |
| 24 hours at 1800°F | 1 | 7 | 7 |
| 4 hours at 2000°F | 7 | 6.5 | 7 |

It is apparent from these data that the catalyst is exceptionally resistant to shrinkage, loss of crush strength and attrition. There was essentially no change in the catalyst after heating for 24 hours at 1,800°F. The crush strength remained the same and the attrition did not change appreciably. The more vigorous treatment, i.e. heating 4 hours at 2,000°F, resulted in a slight increase in shrinkage and some loss in crush strength. The percent of attrition remained the same, however.

EXAMPLE IX

This example illustrates the thermal stability of the catalyst as illustrated by the ability to retain palladium surface area after exposure to high temperatures.

A catalyst prepared in the manner described in Example I and having similar surface area and chemical composition was exposed to high temperatures for long periods of time (Table V). After each thermal treatment the surface area of the palladium was measured utilizing the hydrogen chemisorption technique described in the text. The results clearly show the ultra stable character of the palladium surface area in addition to the important role played by the in maximizing and maintaining the high degree of dispersion of the palladium.

TABLE V

| THERMAL TREATMENT | Pd SURFACE AREA EXPRESSED AS MICROMOLES OF $H_2$ ADSORBED /g. OF CATALYST | |
| --- | --- | --- |
| 24 hours at 1800°F | 1.49 | |
| 14 hours at 1900°F | 1.38 | |
| 14 hours at 2000°F | 1.33 | |
| 14 hours at 2100°F | 1.44 | |
| 14 hours at 2200°F | 0.91 | |
| 3 hours at 1900°F | 0.05 | (Catalyst |

TABLE V-Continued

| THERMAL TREATMENT | Pd SURFACE AREA EXPRESSED AS MICROMOLES OF $H_2$ ADSORBED /g. OF CATALYST |
|---|---|
| | Without Cerium Oxide) |

The importance and function of the cerium oxide in the catalyst is more clearly set out in the data in Table VI which show increasing palladium dispersion (surface area) as the cerium level in the catalyst is increased. The palladium level was held constant at 2.72%. Each catalyst was heated for 3 hours at 1,850°F prior to the hydrogen chemisorption measurement.

TABLE VI

| % CERIUM CALCULATED AS $Ce_2O_3$ IN THE CATALYST | Pd. SURFACE AREA EXPRESSED AS MICROMOLES OF $H_2$ ADSORBED /g of CATALYST |
|---|---|
| 0 | 1.0 |
| 6 | 5.2 |
| 10 | 6.0 |
| 15 | 12.0 |
| 25 | 16.0 |
| 50 | 18.0 |

EXAMPLE X

This example illustrates the preparation and preformance of the catalyst utilizing a commercial grade cerous nitrate as the cerium oxide source.

A catalyst was made in the manner described in Example I utilizing a commercial grade cerous nitrate purchased from the Molybdenum Corporation of America having the following analysis:

| | |
|---|---|
| $CeO_2$ | 98.8% |
| $La_2O_3$ | 0.59% |
| $Pr_6O_{10}$ | 0.30% |
| $Nd_2O_3$ | 0.57% |
| $Ca\,O$ | 0.78% |
| $Sm_2O_3$ | <0.1% |
| $Gd_2O_3$ | <0.1% |
| Other Metal Oxides | <0.1% |

The catalyst was evaluated on the chassis dynamometer and removed 89.6% of the carbon monoxide (to 3.54 g/mile) and 88.3% of the hydrocarbons (to 0.19 g/mile) from the exhaust gas during the Federal EPA driving test.

EXAMPLE XI

Figure 3:
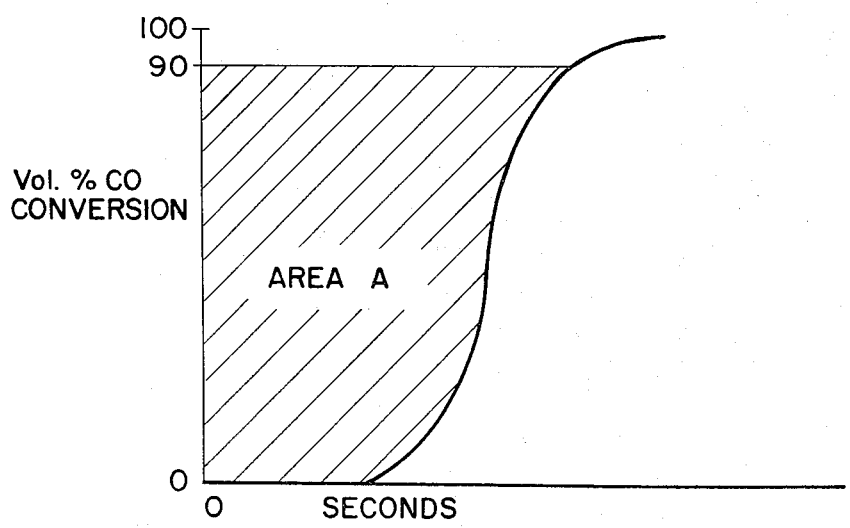

A series of three runs were completed in which (a) ceria was added calculated as $Ce_2O_3$, (b) 6 wt. % rare earth oxide was added and (c) 14 wt. % rare earth oxide was added to give an amount of cerium oxide equivalent to 6%. The fresh activity and the activity indices in these three runs were determined using a procedure in which the concentration of CO and hydrocarbon are monitored simultaneously as a function of time. The activity data is expressed in index form using a plot as shown in FIG. 3. It is apparent from this plot that the catalysts with the lower index numbers (small area) are the most active and that high index numbers (large area) indicate low activity. The data collected in this series of runs is set out in Table VII.

TABLE VII

| Catalyst | Cerium Oxide Content as Wt.% $Ce_2O_3$ | CO Activity Index Fresh | CO Activity Index After 24 hrs. at 1800°F |
|---|---|---|---|
| Catalyst of Example I | 6 | 0.849 | 0.694 |
| Catalyst prepared from 6% Rare Earth Oxide | 3 | 1.389 | 1.401 |
| Catalyst Prepared from 14% Rare Earth Oxide | 6 | 1.345 | 1.337 |

The rare earth oxide used in this preparation contained:
- 50 % — $CeO_2$
- 18 % — $La_2O_3$
- 5 % — $Pr_6O_{11}$ It is apparent from these data that the catalyst prepared from the mixed rare earth oxides does not have the activity of the catalyst prepared according to the process of Example 1 even though a comparable amount of cerium oxide is present in the catalyst.

EXAMPLE XII

A series of runs were completed in which the support was prepared to contain $La_2O_3$, $PrO_2$, $Sm_2O_3$, $Nd_2O_3$ and $Eu_2O_3$ and the results obtained were compared to the catalyst made by the same technique that contains cerium oxide.

In each of these runs 200 g. of alumina was used in preparing the base. The base was then impregnated with a solution of the desired oxide to incipient wetness, dried and heated to 1,850° to 1,875°F for 4 hours. A total of 0.04% palladium was clad on the support by heating the support to 250° to 275°F and spraying 75 ml. of a palladium tetrammine dinitrate solution containing 80 mg. of palladium onto the base. The clad base was then heated for 4 hours at 1,800°F to activate the catalyst.

The alumina containing $La_2O_3$ was prepared by dissolving 33.91 g. of $La(NO_3)_3 \cdot 6H_2O$ in water and diluting to 180 ml. This solution was used to impregnate 200 g. of alumina to incipient wetness. The alumina impregnated with the lanthanum solution was dried and heated to 1,850° to 1,875°F for 4 hours prior to cladding with the palladium tetrammine nitrate solution using the techniques described above.

The alumina containing $Sm_2O_3$ was prepared by diluting a solution containing 32.61 g. of $Sm(NO_3)_3 \cdot 6H_2O$ to 180 ml. and impregnating 200 g. of alumina with this solution using the technique described above. The alumina impregnated with the samarium nitrate solution was heated to 1,850° to 1,875°F for 4 hours prior to cladding with the palladium solution.

The alumina containing $Eu_2O_3$ was prepared by dissolving 32.3 g. of $Eu(NO_3)_3 \cdot 6H_2O$ in water and diluting the solution to 180 ml. This solution was used to impregnate 200 g. of alumina to incipient wetness. The impregnated alumina was dried and heated to 1,850° to 1,875°F for 4 hours before being clad with the palladium tetrammine nitrate solution.

The alumina containing $Nd_2O_3$ was prepared by diluting 119.6 g. of a $Nd(NO_3)_3$ solution containing the equivalent of 0.1068 g. of neodymium oxide per gram of solution to 180 ml. This solution was used to impregnate 200 g. of alumina to incipient wetness. The impregnated alumina was heated to 1,850° to 1,875°F for 4 hours prior to cladding with the palladium tetrammine nitrate solution.

The alumina containing $PrO_2$ was prepared by dissolving 13.33 g. of $PrO_2$ in a small quantity of nitric acid and diluting the resulting solution to 180 ml. This solution was used to impregnate 200 g. of alumina to incipient wetness. The impregnated alumina was then dried, heated to 1,850° to 1,875°F for 4 hours prior to being clad with the palladium solution.

The standard activity indices of this series of catalysts each containing 0.04% palladium, and 6% of the stabilizing oxide is set out in Table VIII below.

TABLE VIII

| Alumina Containing 0.04% Pd and 6% | $CO_2$ Activity Index | |
|---|---|---|
| | Fresh | After 24 hrs. at 1800°F |
| $La_2O_3$ | 1.374 | 2.068 |
| $PrO_2$ | 1.280 | 1.714 |
| $SM_2O_3$ | 1.297 | 1.781 |
| $Nd_2O_3$ | 2.532 | 2.518 |
| $Eu_2O_3$ | 1.337 | 1.777 |
| Cerium Oxide expressed as $Ce_2O_3$ | 0.885 | 0.840 |

Figure 2:
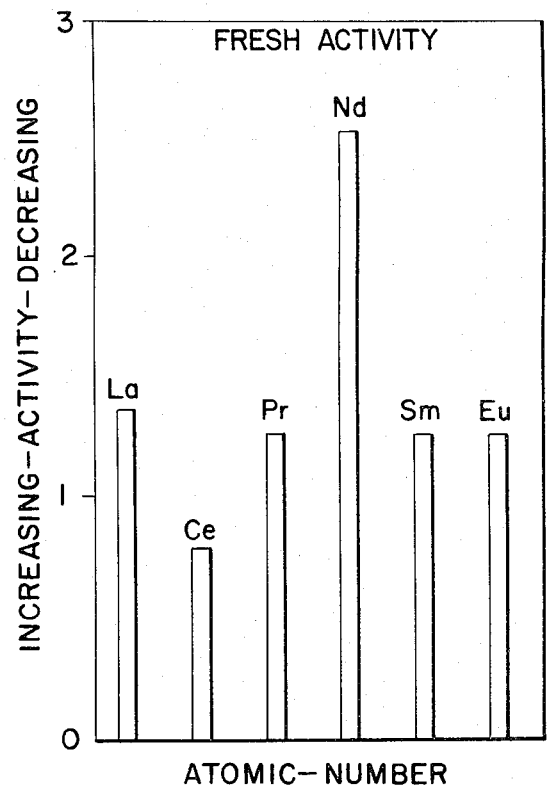

It is obvious from the review of these data that none of the catalysts have as good a fresh activity and as good a retention of the activity after being subjected to 1,800°F for a period of 24 hours as did the sample containing cerium oxide. The catalyst on alumina containing neodymium oxide retained its activity after being heated for 24 hours at 1,800°F but its activity index was substantially higher than the activity index for ceria. This data is shown graphically in FIGS. 1 and 2. It is apparent from review of the data in FIGS. 1 and 2 that the catalyst prepared to contain ceria is a substantially better catalyst than catalysts containing any of the other rare earths.

EXAMPLE XIII

In this example a series of runs are prepared using the general technique described previously. The alumina was impregnated with 6% cerium oxide as $Ce_2O_3$ and the amount of palladium was varied from 0.01 to 0.1%. The data collected in this series of runs is set out in Table IX.

TABLE IX

| Pd Content In Wt. percent | CO Activity Index | |
|---|---|---|
| | Fresh | After 24 hours at 1800°F |
| 0.01 | 1.158 | 0.995 |
| 0.02 | 0.899 | 0.894 |
| 0.03 | 0.904 | 0.796 |
| 0.04 | 0.885 | 0.840 |
| 0.07 | 0.801 | 0.910 |
| 0.10 | 0.743 | 0.754 |

It is apparent from these data that a catalyst containing as little as 0.01% palladium and 6% ceria were more active than any of the catalysts prepared containing 6% of the other rare earths tested. It is also apparent that the incremental improvement in activity when the palladium concentration is above 0.04 wt. % is insufficient to warrant the additional cost of increasing the palladium content of the catalyst.

What we claim is:

1. A catalyst for the conversion of the noxious components in exhaust gases to innocuous entities characterized by:
   a. the ability to retain essentially all its catalytic activity after exposure to temperatures of 1,800°–2,000°F for extended periods of time,
   b. a shrinkage of less than 1% after heating to 1,800°F for periods of 10 to 24 hours; which comprises 0.01 to 1 weight percent of a noble metal selected from the group consisting of platinum, palladium, and mixtures thereof distended on a support containing 2–50% of cerium oxide.

2. The catalyst according to claim 1 wherein the catalyst consists essentially of: 0.01 to 0.5 weight percent Pd; 2 to 10 weight percent cerium oxide distended on nodules of alumina.

3. The catalyst according to claim 1 wherein the catalyst support is selected from the group consisting of mullite, spinel, silica, or alumina.

4. A catalyst system for the conversion of the noxious components in exhaust gases to innocuous entities which comprises a monolithic support having 0.05 to 5 weight percent of a noble metal selected from the group consisting of platinum, palladium, and mixtures thereof and 2 to 50 weight percent of cerium oxide on a catalyst support distended on said monolith, said catalyst system being characterized by the ability to retain essentially all the catalytic activity after exposure to temperatures in excess of 1,800°F for extended periods of time.

5. The catalyst system according to claim 4 wherein the monolith, exclusive of the catalyst coating consists essentially of spodumene, cordierite, mullite, spinel, or alumina.

6. The catalytic system according to claim 4 wherein the catalyst support is selected from the group consisting of alumina, silica, mullite, and spinel.

7. The catalyst system according to claim 4 wherein the catalyst support is alumina activated and stabilized by the addition of 2–50 weight percent cerium oxide.

* * * * *